(12) United States Patent
Jochmann et al.

(10) Patent No.: US 6,315,626 B2
(45) Date of Patent: Nov. 13, 2001

(54) ADHESIVELY BONDED PRESSURE-RESISTANT GLASS BODIES

(75) Inventors: Peter Jochmann; Wilfried Hupfer, both of Jena; Edith Zimmermann, Groitscen, all of (DE)

(73) Assignee: QVF Pilot-Tec GmbH, Jena (DE)

( * ) Notice: Subject to any disclaimer, the term of this patent is extended or adjusted under 35 U.S.C. 154(b) by 0 days.

(21) Appl. No.: 09/741,904

(22) Filed: Dec. 22, 2000

Related U.S. Application Data

(63) Continuation of application No. PCT/EP99/04457, filed on Jun. 15, 1999.

(30) Foreign Application Priority Data

Jun. 26, 1998 (DE) .............................................. 198 28 516

(51) Int. Cl.[7] .................................................. B63B 22/24
(52) U.S. Cl. ........................................... 441/32; 220/4.25
(58) Field of Search .............................. 441/32; 220/4.25, 220/662

(56) References Cited

U.S. PATENT DOCUMENTS

| 3,563,089 | 2/1971 | Henderson . | |
|---|---|---|---|
| 3,587,122 | 6/1971 | Humphrey . | |
| 3,713,412 | * | 1/1973 | Januzzi .................................. 441/32 |
| 3,912,482 | 10/1975 | La Grouw et al. . | |
| 4,300,654 | 11/1981 | Raymond et al. . | |

FOREIGN PATENT DOCUMENTS

| 0 426 890 A1 | 11/1989 | (EP) . |
|---|---|---|
| WO 00/00844 | 1/2000 | (EP) . |

* cited by examiner

*Primary Examiner*—Jesus D. Sotelo
(74) *Attorney, Agent, or Firm*—Gilberto M. Villacorta; Corrinne M. Pouliquen; Pepper Hamilton LLP

(57) ABSTRACT

The invention relates to pressure-proof glass bodies (3) composed of two half-spheres (1,2) comprising or not a cylindrical intermediate part (10) and having complementary surfaces (4) which are brought into contact with each other, whereby the outer surfaces of a formed seam are even and flat. The glass elements are assembled in a non detachable way by gluing them together with a curable glue which is applied to said complementary surfaces. A glued seam (6) which is formed, for example, by a light or heat-curable glue, can be covered with a permanently elastic sealing material and then with a band and/or tape. The inventive glass bodies are characterized in that they are simple to manufacture and safe to operate when they are used in the oceanographic field.

24 Claims, 3 Drawing Sheets

ADHESIVELY BONDED PRESSURE-RESISTANT GLASS BODIES

Figure 1:
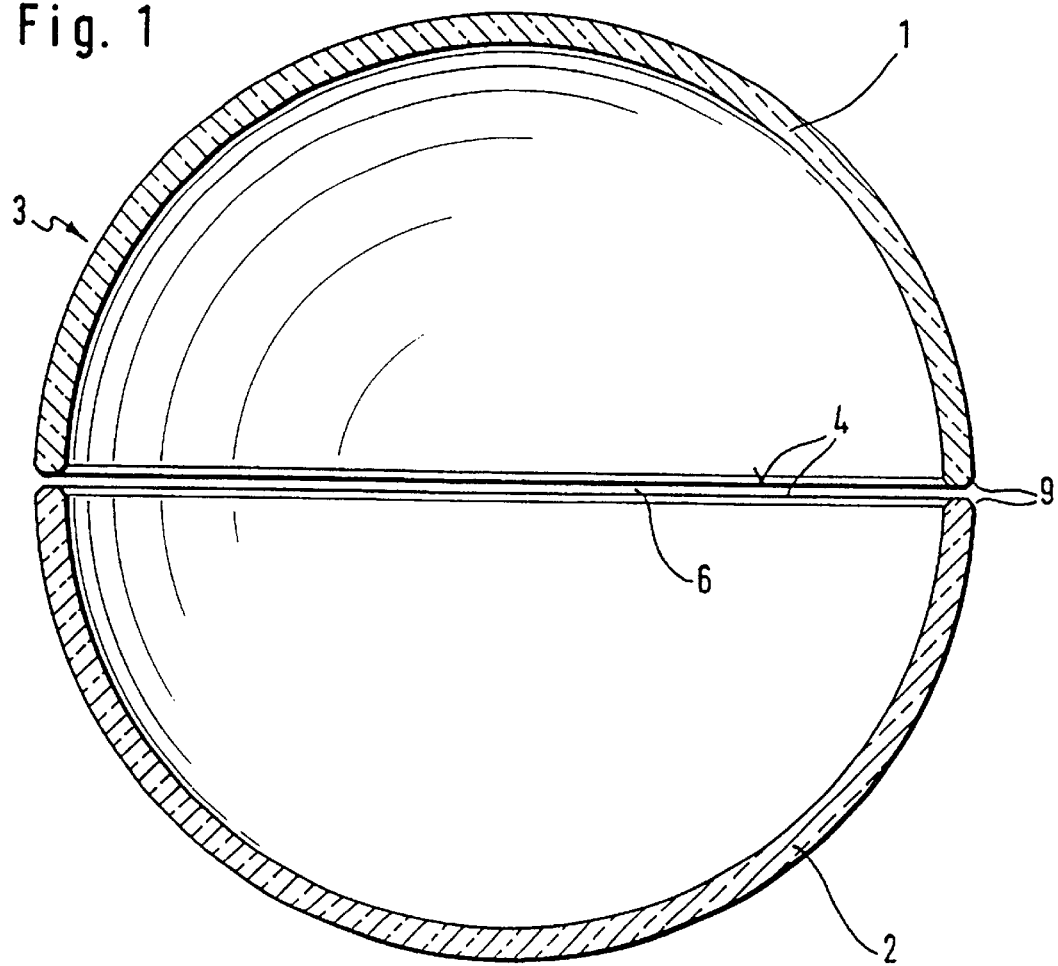

This application is a continuation of International Application No. PCT/EP99/04457, filed Jun. 15, 1999, which in turn claims priority from German Patent Application No. 198 28 516.7, filed Jun. 26, 1998, both of which are incorporated herein by reference.

The invention relates to adhesively-bonded pressure-resistant glass bodies comprising two hemispheres, with or without a cylindrical connecting element, for oceanographic use, and to a method of producing the glass bodies and to the use of the same.

The invention relates in particular to a glass housing for oceanographic use which is formed from two hemispheres, with or without a cylindrical connecting element, which are arranged such that they form a spherical body, of which the outer surfaces are smooth in every direction. According to the invention, the glass parts which form the pressure-resistant glass body are adhesively bonded together, with the result that they cannot be displaced in relation to one another.

The prior art discloses oceanographic instrument housings which are constructed from two glass-hemisphere assemblies. They have been used for some time now as floats and/or instrument housings in oceanographic research.

For example, U.S. Pat. No. 3,563,089 describes an oceanographic instrument housing comprising two glass hemispheres and an appropriate protective cage in each case, the glass hemispheres and the protective cages having access openings through which measuring implements or the like can be introduced. The two glass hemispheres are each protected all the way round by a protective cage. The flat end surfaces of the glass hemispheres are each located in grooves of the protective cage, with the result that, when the circular openings of the two hemispheres are joined together, it is the protective cages, and not the glass hemispheres, which come to rest directly one upon the other. The connection of the two glass hemispheres is first of all produced by clamps and is then secured by a vacuum being produced in the interior of the sphere. The smooth end surfaces of the glass hemispheres in the grooves of the protective cage are suitably lubricated, e.g. with a silicone grease. For sealing the interior of the sphere against the penetration of water, a beaded edge is provided on the outside in the angle between the glass hemisphere and protective cage. Between the two protective-cage surfaces resting one upon the other, the sealing is likewise produced via a sealing ring seated in a channel.

The disadvantages here are, in particular, the high operational outlay with a large number of individual operations and the additional material outlay for the outer protective cage. In addition, sealing by sealing rings is always unreliable to a certain extent.

U.S. Pat. No. 3,587,122 describes a round oceanographic instrument housing made of glass. This patent takes as its departure point two glass hemispheres which are fitted directly one upon the other by way of their semicircular openings. In order that reliable sealing can take place here, the two matching surfaces have to be face-ground to ±0.001 inches (±4 µm). The sealing at the equatorial seam then takes place by a silicone grease being applied to said surfaces. In order to prevent the hemispheres from being displaced in relation to one another, hose clamps are carefully applied. A vacuum is then produced. The disadvantage here is constituted by the glass spheres fracturing, this being caused by water penetrating through the silicone grease with a high external pressure.

In order to avoid this problem, the above-mentioned U.S. patent, then, proposes to dispense with the silicone grease, i.e. to bring the two surfaces to rest directly one upon the other. The necessary sealing then takes place by a non-curing material being applied to the outside of the equatorial seam as a whole and by this material then being covered by an adhesive tape. It is then no longer possible for water to penetrate through the seam.

The above-mentioned disadvantages are indeed avoided by this embodiment, but, the latter has the problem of high operational outlay continuing to be necessary for the required precision grinding of the two planar surfaces of the glass hemispheres. In addition, the two glass hemispheres are only insufficiently secured against mutual displacement by this embodiment.

It is imperative for both systems for a vacuum to be produced in the interior of the hemispheres for fixing purposes.

Accordingly, the object of the present invention is to obtain pressure-resistant glass bodies comprising two hemispheres, with or without a cylindrical intermediate element, which are easily connected to one another in a non-releasable manner with low operational outlay.

This object is achieved according to the invention by claim 1.

Figure 2:
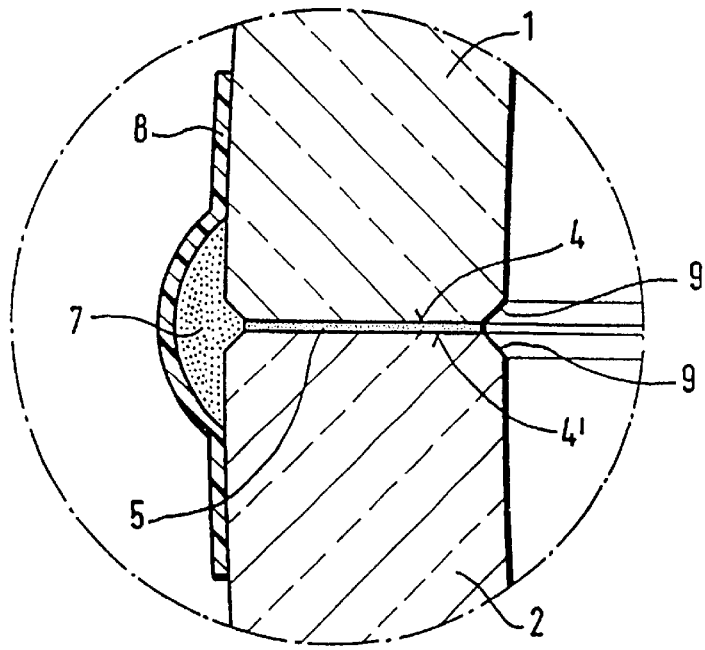
Figure 3:
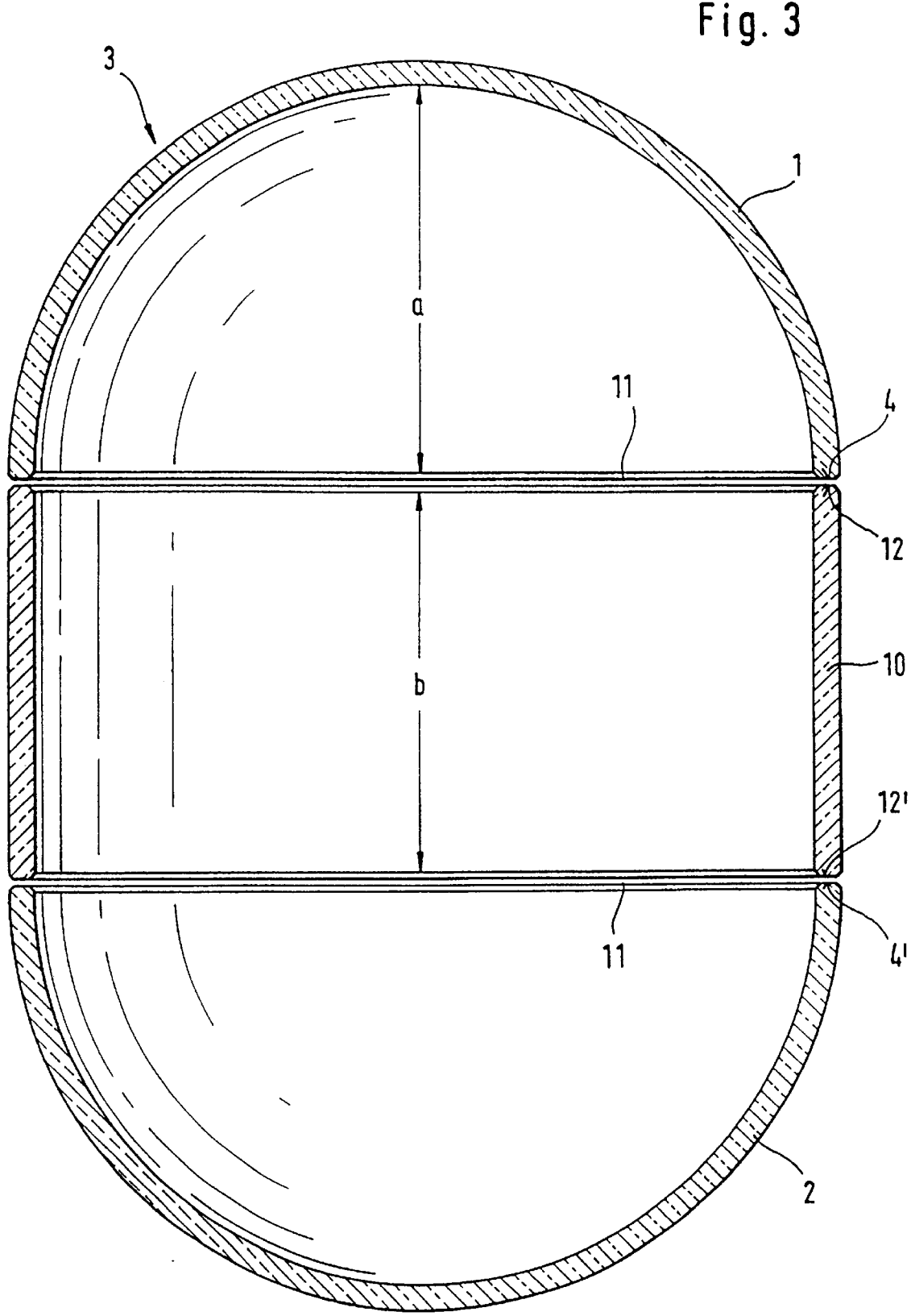
Figure 4:
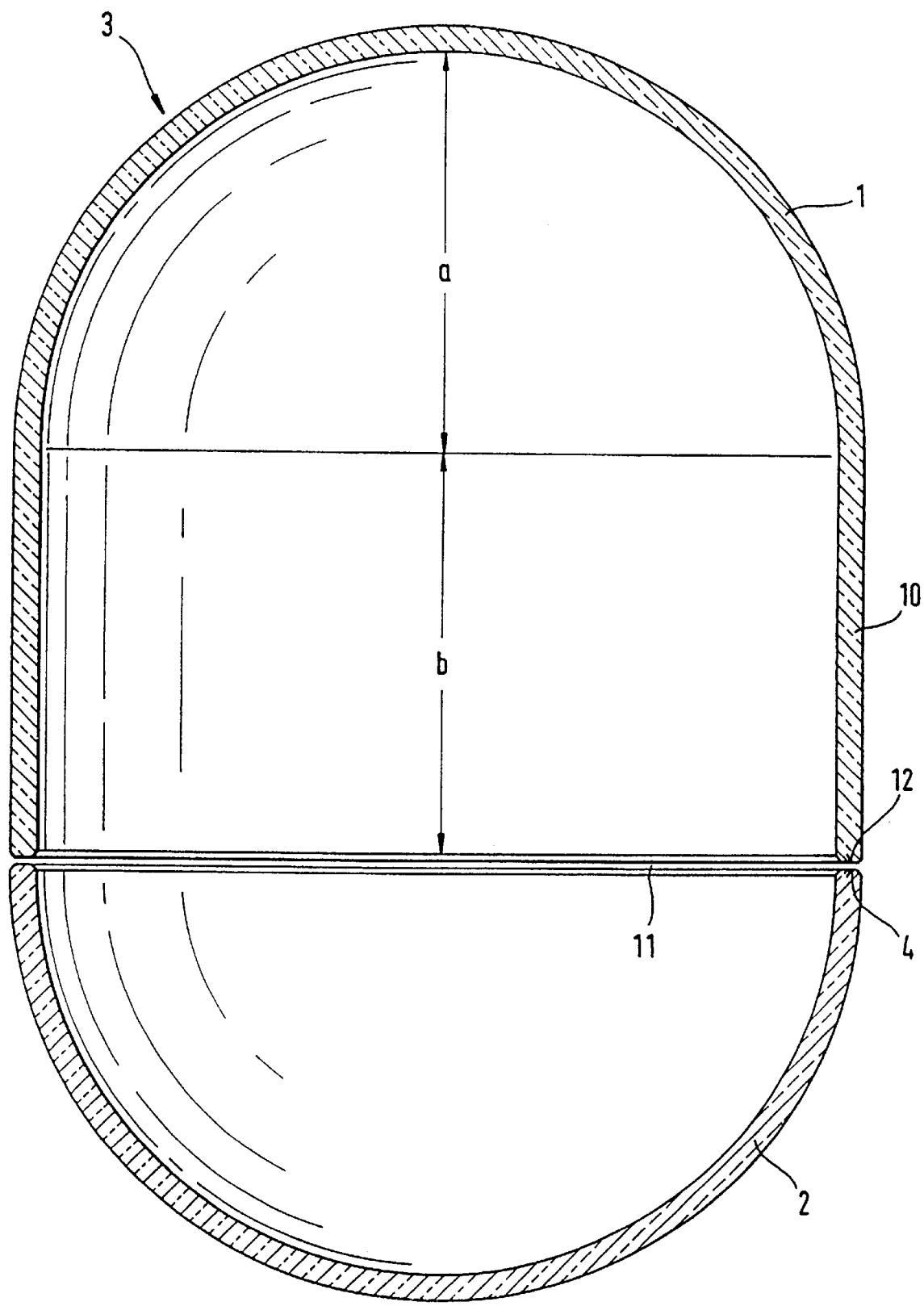

The features of the invention can be gathered, in particular, from the drawings, in which:

FIG. 1 shows a section, perpendicular to the equator, through the two hemispherical halves of the glass body according to the invention, FIG. 2 shows an enlarged detail of the glass-body shell in the region in which the two glass bodies butt against one another by way of their smooth surfaces, FIG. 3 shows a section, perpendicular to the equator of the hemispheres, through a specific embodiment of the glass body according to the invention, the two glass hemispheres being connected to one another via a cylindrical glass body, and FIG. 4 shows a section through a further embodiment of the glass body according to the invention, the cylindrical glass body being integrally formed directly on one of the two glass hemispheres.

The drawings are to be regarded merely as exemplary embodiments.

FIG. 1 shows the two glass hemispheres 1 and 2 arranged to form a glass body 3 according to the invention. According to the invention, the two hemispheres are joined together in a non-releasable manner, by way of their end surfaces 4, at the equator by means of a curing adhesive to form a sphere, an adhesive-bonding layer 5 running annularly around the circumference being formed between the glass hemispheres 1, 2. Said adhesive-bonding layer 5 is arranged between the end surfaces 4, 4' of the respective hemispheres 1, 2.

In accordance with the specific embodiment, it is additionally possible, as shown in FIG. 2, for the purpose of sealing the glass body on the contact surface 4 or 4' of the glass-body end sides with adhesive, for the equator seam 6 to be provided with an elastic sealing compound 7, which is covered by a tape 8, from the outside. The contact surface 4 on the end side of the hemispheres is advantageously a normally ground surface which preferably has a small chamfer 9.

A further specific embodiment is shown in FIG. 3. In this case, the two glass hemispheres 1 and 2 are connected to one another in a manner according to the invention via a preferably cylindrical glass body 10. This then produces two adhesive-bonding layers 5, one each between the end surface 4, 4' of the glass hemispheres and the end surfaces 12, 12' of the cylindrical glass body 10.

FIG. 4 shows a specific embodiment of the glass body 3 according to the invention with a cylindrical glass body 10 it is possible, according to the invention, for the preferably cylindrical glass body 10 to be integrally formed directly, by an end-surface side 12, on the end surface 4 of one of the two glass hemispheres 1 or 2 according to the invention. This then produces, in turn, just one adhesive-bonding layer 5 between the end surfaces 4 of the second glass hemisphere 2 or 1 and the end surface 12 of the integrally formed cylindrical glass body.

The advantage of this cylindrically extended embodiment resides in the glass body having a larger interior than in the case of a spherical embodiment. It is thus possible to use larger-sized equipment and apparatus or to improve the buoyancy.

The distances a and b, which respectively characterize the size of the glass hemispheres (the distance a is the radius of the glass hemispheres) and of the cylindrical glass body used according to the invention (distance b corresponds to the height of the cylindrical glass body), may be selected as desired here. The two distances a and b are preferably in the same size range, and it is particularly preferably the case that a=b.

The wall thicknesses of the hemispheres 1, 2 and of the cylindrical body 10 are of no relevance to the adhesive bonding. They are only important as far as the pressure resistance is concerned. For this purpose, use is preferably made of glass bodies with a diameter (2*a) of 200–600 mm and a wall thickness of 7–20 mm.

Furthermore, the glass bodies according to the invention are pressure-resistant up to at least 700 bar and are permanently resistant to sea water.

The provision of bores for the usual purposes (leadthroughs for connectors, bushings and valves) does not affect these properties.

In comparison with the production known from the prior art, the production of the glass bodies requires fewer operations (merely with a normally ground surface on the end side of the hemispheres or of the cylindrical body, without precision grinding) and does not require an installation for producing a vacuum in the assembly for the purpose of fixing the glass bodies. This reduces production costs. The smaller number of operations reduces the probability of the glass surface being damaged during the production process. Surface damage results in the glass fracturing during use of the glass bodies. There is thus a considerable improvement in the operational reliability of the systems during use.

In order to achieve these advantages, the glass bodies are permanently adhesively bonded to one another. There are no particular restrictions on the type of adhesive used in this case. However, it is necessary for the adhesive to withstand the pressure corresponding to the operating depth (preferably 700 bar), to be resistant to aqueous media, in particular to sea water, and to adhere sufficiently well to glass.

Light-curing or heat-curing adhesive systems based on modified acrylate or epoxy resin are preferred. However, in general, other adhesive systems which satisfy the abovementioned requirements can also be used according to the invention.

The glass bodies described are suitable as buoyancy spheres, for example for oceanographic systems, and for the one-off installation of implements, instruments and energysupply systems for oceanographic use. Operating depths to 7000 m are preferred.

They may also be used in groups of two or more. For example, better buoyancy is produced as a result.

What is claimed is:

1. A pressure-resistant glass body comprising two hemispheres with matching surfaces which are brought into contact with one another, with the result that the outer surfaces form a sphere, wherein the two hemispheres are connected to one another between the matching contact surfaces by an adhesive-bonding layer.

2. The pressure-resistent glass body of claim 1 which the outer surfaces are smooth and flush at a seam around an equator of the sphere.

3. The pressure-resistent glass body of claim 1 in which said adhesive-bonding layer comprises a curving adhesive.

4. The pressure-resistant glass body of claim 1, in which a cylindrical glass body is introduced between matching surfaces of the hemispheres.

5. The pressure-resistent glass body of claim 4, in which the cylindrical glass body is integrally formed, by one of its end surfaces, on an end surface of one of the two glass hemispheres.

6. The pressure-resistent glass body of claim 1, in which the contact surfaces of the glass body are covered by a permanently elastic sealing compound.

7. The pressure-resistant glass body of claim 6, in which the contact surfaces of the glass body are covered by a tape.

8. The pressure-resistant glass body of claim 1 in which the adhesive-bonding layers of the glass body have a light-curing adhesive.

9. The pressure-resistant glass body of claim 1 in which the adhesive-bonding layers of the glass body have a heat-curing adhesive.

10. The pressure-resistant glass body of claim 1 in which the adhesive-bonding layers are resistant to sea water.

11. The pressure-resistant glass body of claim 1 in which the glass body is pressure-resistant up to 700 bar.

12. The pressure-resistant glass body of claim 1 in which the wall thickness of the glass body is in a range between 7 and 20 mm.

13. The pressure-resistant glass body of claim 1 in which the diameter of the glass body is in a range between 200 and 600 mm.

14. A buoyancy sphere for oceanographic systems comprising the pressure-resistant glass body of claim 1.

15. The buoyancy sphere of claim 14 which is coupled to one or more other pressure-resistant glass bodies.

16. A method of assembling a pressure-resistant glass body having two hemispheres comprising, placing two hemispheres against one another such that their outer surfaces are smooth and flush at a seam around the equator, the contact surfaces of the two hemispheres adhesively bonded to one another by an adhesive.

17. The method of claim 16, which further comprises fitting a cylindrical glass body in between the two hemispheres.

18. The method of claim 17 in which the cylindrical glass body is integrally formed on one of the two hemispheres.

19. The method of claim 16, in which the contact surfaces of the glass body are covered by a permanently elastic sealing compound.

20. The method of claim 16 in which adhesive-bonding connections of the glass parts are made to be resistant to sea water.

21. The method of claim 16 in which the glass body is made to be pressure-resistant up to 700 bar.

22. The method of claim 16 in which a range between 7 and 20 mm is selected for the wall thickness of the glass body.

23. The method of claim 16 which a range between 200 and 600 mm is selected as the diameter of the glass body.

24. The method of claim 16 in which bores are provided in the outer wall of the glass body as lead-throughs.

* * * * *

UNITED STATES PATENT AND TRADEMARK OFFICE
CERTIFICATE OF CORRECTION

PATENT NO. : 6,315,626 B2
DATED : November 13, 2001
INVENTOR(S) : Peter Jochmann et al.

It is certified that error appears in the above-identified patent and that said Letters Patent is hereby corrected as shown below:

<u>Title page,</u>
Item [63], should read:
-- [63] Continuation of application No. PCT/EP99/04457, filed on Jun. 26, 1999. --

Signed and Sealed this

Twenty-fourth Day of December, 2002

JAMES E. ROGAN
*Director of the United States Patent and Trademark Office*